United States Patent
Hatton (10) Patent No.: US 9,049,584 B2
(45) Date of Patent: Jun. 2, 2015

(54) METHOD AND SYSTEM FOR TRANSMITTING DATA USING AUTOMATED VOICE WHEN DATA TRANSMISSION FAILS DURING AN EMERGENCY CALL

(71) Applicant: Ford Global Technologies, LLC, Dearborn, MI (US)

(72) Inventor: David Anthony Hatton, Berkley, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 13/748,636

(22) Filed: Jan. 24, 2013

(65) Prior Publication Data

US 2014/0206308 A1 Jul. 24, 2014

(51) Int. Cl.
*H04M 11/04* (2006.01)
*H04W 4/22* (2009.01)
(Continued)

(52) U.S. Cl.
CPC .............. *H04W 4/22* (2013.01); *H04W 76/007* (2013.01); *H04W 4/046* (2013.01)

(58) Field of Classification Search
CPC . H04W 4/22; H04W 76/007; H04W 36/0022; H04W 48/18; H04W 4/046; H04M 11/04
USPC ............. 455/404.1, 404.2, 414.2, 418, 422.1, 455/450, 550.1
See application file for complete search history.

(56) References Cited

U.S. PATENT DOCUMENTS

| 4,442,485 A | 4/1984 | Ota et al. |
| 4,833,477 A | 5/1989 | Tendler |
| 4,937,796 A | 6/1990 | Tendler |

(Continued)

FOREIGN PATENT DOCUMENTS

| DE | 102008060567 | 2/2010 |
| EP | 1507129 | 2/2005 |

(Continued)

OTHER PUBLICATIONS

Notice of Reasons for Rejections, JP2010-514958; Dec. 4, 2012; 3 pages.

(Continued)

*Primary Examiner* — Olumide T Ajibade Akonai
(74) *Attorney, Agent, or Firm* — Jennifer Stec; Brooks Kushman PC (57) ABSTRACT

A vehicle communication system enables one or more processors to receive indication that an emergency event has taken place from an emergency detection sensor position throughout the vehicle. An emergency condition detection signal may be automatically sent by a detection sensor, or manually sent by a vehicle occupant pushing an emergency assistance button. The processor may receive vehicle parameter data indicating one or more vehicle parameters including, but not limited to, vehicle global position coordinates. The processor may transmit a communication to an emergency response center that an emergency has been indicated at the vehicle. The vehicle parameter data may be transmitted to the emergency response center using a data transmission signal. If the data transmission signal has failed transmission after several attempts, the processor may convert at least a portion of the vehicle parameter data to speech signals and communicate the speech signals to the emergency response center.

20 Claims, 4 Drawing Sheets

(51) Int. Cl.
 *H04W 76/00* (2009.01)
 *H04W 4/04* (2009.01)

(56) References Cited

U.S. PATENT DOCUMENTS

| | | | |
|---|---|---|---|
| 5,144,323 A | 9/1992 | Yonkers | |
| 5,223,844 A | 6/1993 | Mansell et al. | |
| 5,388,147 A * | 2/1995 | Grimes | 455/404.2 |
| 5,515,043 A | 5/1996 | Bernard et al. | |
| 5,555,286 A | 9/1996 | Tendler | |
| 5,598,460 A | 1/1997 | Tendler | |
| 5,649,059 A | 7/1997 | Tendler et al. | |
| 5,736,962 A | 4/1998 | Tendler | |
| 5,825,098 A | 10/1998 | Darby et al. | |
| 6,014,555 A | 1/2000 | Tendler | |
| 6,073,004 A | 6/2000 | Balachandran | |
| 6,151,385 A | 11/2000 | Reich et al. | |
| 6,266,617 B1 | 7/2001 | Evans | |
| 6,275,713 B1 | 8/2001 | Toda | |
| 6,292,551 B1 | 9/2001 | Entman et al. | |
| 6,496,107 B1 | 12/2002 | Himmelstein | |
| 6,504,909 B1 | 1/2003 | Cook et al. | |
| 6,516,198 B1 | 2/2003 | Tendler | |
| 6,519,463 B2 | 2/2003 | Tendler | |
| 6,532,372 B1 | 3/2003 | Hwang | |
| 6,608,887 B1 | 8/2003 | Reksten et al. | |
| 6,621,892 B1 * | 9/2003 | Banister et al. | 379/88.14 |
| 6,647,270 B1 | 11/2003 | Himmelstein | |
| 6,680,998 B1 | 1/2004 | Bell et al. | |
| 6,757,528 B1 | 6/2004 | Cardina et al. | |
| 6,775,356 B2 | 8/2004 | Salvucci et al. | |
| 6,778,820 B2 | 8/2004 | Tendler | |
| 6,952,155 B2 | 10/2005 | Himmelstein | |
| 7,027,842 B2 | 4/2006 | Zhang et al. | |
| 7,034,238 B2 | 4/2006 | Uleski et al. | |
| 7,050,818 B2 | 5/2006 | Tendler | |
| 7,092,723 B2 | 8/2006 | Himmelstein | |
| 7,113,091 B2 | 9/2006 | Script et al. | |
| 7,119,669 B2 | 10/2006 | Lundsgaard et al. | |
| 7,123,926 B2 | 10/2006 | Himmelstein | |
| 7,139,549 B2 | 11/2006 | Islam et al. | |
| 7,164,921 B2 | 1/2007 | Owens et al. | |
| 7,228,145 B2 | 6/2007 | Burritt et al. | |
| 7,305,243 B1 | 12/2007 | Tendler | |
| 7,400,886 B2 | 7/2008 | Sahim et al. | |
| 7,447,508 B1 | 11/2008 | Tendler | |
| 7,450,955 B2 | 11/2008 | Himmelstein | |
| 7,463,896 B2 | 12/2008 | Himmelstein | |
| 7,479,900 B2 | 1/2009 | Horstemeyer | |
| 7,482,952 B2 | 1/2009 | Horstemeyer | |
| 7,505,772 B2 | 3/2009 | Himmelstein | |
| 7,536,189 B2 | 5/2009 | Himmelstein | |
| 7,548,158 B2 | 6/2009 | Titus et al. | |
| 7,574,195 B2 | 8/2009 | Krasner et al. | |
| 7,580,697 B2 | 8/2009 | Lappe et al. | |
| 7,580,782 B2 | 8/2009 | Breed et al. | |
| 7,596,391 B2 | 9/2009 | Himmelstein | |
| 7,599,715 B2 | 10/2009 | Himmelstein | |
| 7,626,490 B2 | 12/2009 | Kashima | |
| 7,706,796 B2 | 4/2010 | Rimoni et al. | |
| 7,747,291 B2 | 6/2010 | Himmelstein | |
| 7,783,304 B2 | 8/2010 | Himmelstein | |
| 7,825,901 B2 | 11/2010 | Potera | |
| 7,844,282 B1 | 11/2010 | Tendler | |
| 7,885,685 B2 | 2/2011 | Himmelstein | |
| 7,894,592 B2 | 2/2011 | Book et al. | |
| 7,902,960 B2 | 3/2011 | Tsuchimochi et al. | |
| 7,904,053 B2 * | 3/2011 | Krasner et al. | 455/404.2 |
| 7,907,976 B2 | 3/2011 | Himmelstein | |
| 7,957,772 B2 | 6/2011 | Charlier et al. | |
| 8,036,634 B2 | 10/2011 | Dimeo et al. | |
| 8,060,117 B1 | 11/2011 | Tendler | |
| 8,224,346 B2 | 7/2012 | Himmelstein | |
| 8,396,447 B2 | 3/2013 | Reich et al. | |
| 2001/0044302 A1 | 11/2001 | Okuyama | |
| 2002/0086718 A1 | 7/2002 | Bigwood et al. | |
| 2003/0227381 A1 | 12/2003 | Best, Jr. | |
| 2003/0231550 A1 | 12/2003 | Macfarlane | |
| 2004/0162064 A1 | 8/2004 | Himmelstein | |
| 2004/0183671 A1 | 9/2004 | Long | |
| 2005/0037730 A1 | 2/2005 | Montague | |
| 2005/0048948 A1 | 3/2005 | Holland et al. | |
| 2005/0099275 A1 | 5/2005 | Kamdar et al. | |
| 2005/0119030 A1 | 6/2005 | Bauchot et al. | |
| 2005/0197174 A1 | 9/2005 | Hasan et al. | |
| 2005/0222933 A1 | 10/2005 | Wesby | |
| 2005/0275505 A1 | 12/2005 | Himmelstein | |
| 2006/0049922 A1 | 3/2006 | Kolpasky et al. | |
| 2006/0061483 A1 | 3/2006 | Smith et al. | |
| 2006/0071804 A1 | 4/2006 | Yoshioka | |
| 2006/0165015 A1 | 7/2006 | Melick et al. | |
| 2006/0217105 A1 | 9/2006 | Kumar P S et al. | |
| 2006/0224305 A1 | 10/2006 | Ansari et al. | |
| 2006/0256794 A1 * | 11/2006 | Rezaiifar et al. | 370/394 |
| 2006/0262103 A1 | 11/2006 | Hu et al. | |
| 2006/0288053 A1 | 12/2006 | Holt et al. | |
| 2007/0050248 A1 | 3/2007 | Huang et al. | |
| 2007/0053513 A1 | 3/2007 | Hoffberg | |
| 2007/0106897 A1 | 5/2007 | Kulakowski | |
| 2007/0142028 A1 | 6/2007 | Ayoub et al. | |
| 2007/0171854 A1 | 7/2007 | Chen et al. | |
| 2007/0203643 A1 | 8/2007 | Ramaswamy et al. | |
| 2007/0218923 A1 | 9/2007 | Park et al. | |
| 2007/0243853 A1 | 10/2007 | Bumiller et al. | |
| 2007/0264990 A1 | 11/2007 | Droste et al. | |
| 2007/0281603 A1 | 12/2007 | Nath et al. | |
| 2008/0039018 A1 | 2/2008 | Kim | |
| 2008/0080687 A1 | 4/2008 | Broms | |
| 2008/0139118 A1 | 6/2008 | Sanguinetti | |
| 2008/0140665 A1 | 6/2008 | Ariel et al. | |
| 2008/0143497 A1 | 6/2008 | Wasson et al. | |
| 2008/0150683 A1 | 6/2008 | Mikan et al. | |
| 2008/0177541 A1 | 7/2008 | Satomura | |
| 2008/0180237 A1 | 7/2008 | Fayyad et al. | |
| 2008/0208446 A1 | 8/2008 | Geelen et al. | |
| 2008/0243545 A1 | 10/2008 | D'Ambrosia et al. | |
| 2009/0002145 A1 | 1/2009 | Berry et al. | |
| 2009/0099732 A1 | 4/2009 | Pisz | |
| 2009/0117924 A1 * | 5/2009 | Kfoury et al. | 455/466 |
| 2009/0149153 A1 | 6/2009 | Lee | |
| 2009/0160607 A1 | 6/2009 | Edwards et al. | |
| 2009/0161836 A1 | 6/2009 | Oesterling | |
| 2009/0164053 A1 | 6/2009 | Oesterling | |
| 2009/0186596 A1 | 7/2009 | Kaltsukis | |
| 2009/0187300 A1 | 7/2009 | Everitt et al. | |
| 2009/0253403 A1 | 10/2009 | Edge et al. | |
| 2009/0261958 A1 | 10/2009 | Sundararajan | |
| 2009/0286504 A1 | 11/2009 | Krasner et al. | |
| 2010/0035598 A1 | 2/2010 | Lee et al. | |
| 2010/0058333 A1 | 3/2010 | Peterson | |
| 2010/0069018 A1 | 3/2010 | Simmons et al. | |
| 2010/0076764 A1 | 3/2010 | Chengalvarayan | |
| 2010/0097239 A1 | 4/2010 | Campbell et al. | |
| 2010/0190479 A1 | 7/2010 | Scott et al. | |
| 2010/0202368 A1 | 8/2010 | Hans | |
| 2010/0210211 A1 | 8/2010 | Price | |
| 2010/0227582 A1 | 9/2010 | Berry et al. | |
| 2010/0227584 A1 | 9/2010 | Hong | |
| 2010/0240337 A1 | 9/2010 | Dimeo et al. | |
| 2010/0253535 A1 | 10/2010 | Thomas et al. | |
| 2010/0273466 A1 | 10/2010 | Robertson et al. | |
| 2010/0323657 A1 | 12/2010 | Barnard et al. | |
| 2010/0323660 A1 | 12/2010 | Himmelstein | |
| 2010/0330972 A1 | 12/2010 | Angiolillo | |
| 2011/0003578 A1 | 1/2011 | Chen et al. | |
| 2011/0028118 A1 | 2/2011 | Thomas | |
| 2011/0059720 A1 | 3/2011 | Penix et al. | |
| 2011/0071880 A1 | 3/2011 | Spector | |
| 2011/0098016 A1 | 4/2011 | Hatton | |
| 2011/0201302 A1 | 8/2011 | Hatton | |
| 2011/0202233 A1 * | 8/2011 | Hatton | 701/36 |
| 2011/0225228 A1 | 9/2011 | Westra et al. | |
| 2011/0230159 A1 | 9/2011 | Hatton | |
| 2011/0275321 A1 | 11/2011 | Zhou et al. | |

(56) References Cited

U.S. PATENT DOCUMENTS

2012/0028599 A1 2/2012 Hatton et al.
2012/0053782 A1 3/2012 Gwozdek et al.
2012/0264395 A1 10/2012 Bradburn et al.
2012/0281605 A1 11/2012 Himmelstein
2013/0244611 A1* 9/2013 Singhal .................. 455/404.2

FOREIGN PATENT DOCUMENTS

| | | |
|---|---|---|
| EP | 2093982 | 12/2007 |
| EP | 2219163 | 1/2009 |
| EP | 2037664 | 3/2009 |
| JP | 2001043472 | 2/2001 |
| JP | 2003022490 | 1/2003 |
| JP | 2006005744 | 1/2006 |
| JP | 2006270564 | 10/2006 |
| WO | 2008011432 | 1/2008 |

OTHER PUBLICATIONS

Intellectual Property Office Examination Report; GB1117765.6; dated Aug. 22, 2013; 2 pages.
European MoU for Realisation of Interoperable in-Vehicle eCall; May 28, 2004; 7 Pages.
Ford Motor Company, "SYNC with Navigation System," Owner's Guide Supplement, SYNC System Version 1 (Jul. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 1-3.
Wayne Thalls, "Santa Cruz Ares Handbook", Santa Cruz Ares 1990, p. 1-29.
Ford Motor Company, "SYNC," Owner's Guide Supplement, SYNC System Version 1 (Nov. 2007).
EPO Search Report; 11153638.9-1525; mailed May 27, 2011.
PCT Search Report; PCT App. PCT/US10/027451; Mailed May 20, 2010.
PCT Search Report; PCT/US08/66878; Mailed Aug. 17, 2008.
EPO Extended Search Report; 11009966.0-2413; dated May 24, 2012.
EPO Search Report; 11154014.2-2414; dated May 31, 2011.
Office Action, Non-Final Rejection, FMC3515PUS dated Apr. 22, 2013.
Wikipedia, "e-Call" project of the European Commission web page (e-Call—Wikipedia, the free encyclopedia).
"eCall Toolbox" web page (SafetySupport, 2005).

* cited by examiner

METHOD AND SYSTEM FOR TRANSMITTING DATA USING AUTOMATED VOICE WHEN DATA TRANSMISSION FAILS DURING AN EMERGENCY CALL

TECHNICAL FIELD

Embodiments of the present invention generally relate to a method and system for notifying emergency responders in the event of an automobile accident or other emergency.

BACKGROUND

U.S. Patent Application 2010/0227584 generally discloses an in-vehicle system (IVS) captures data such as location data and in an emergency automatically places a call to an emergency call taker or PSAP via a wireless telecommunications network. After a voice call session is established, the IVS system transmits a predetermined control signal through the voice channel. The control signal directs the call taker system to prepare to receive data. Preferably, the control signal comprises at least one audio frequency tone. This may be done without human intervention. After transmission of essential information, the IVS system may switch on audio connections for live human voice conversation.

U.S. Patent Application 2010/0202368 generally discloses methods and an apparatus for providing useful data in association with a high-priority call such as an emergency call. In one embodiment, the data comprises a data (e.g., an MSD or FSD) embedded within one or more real-time protocol packets such as RTP Control Protocol (RTCP) packets, that are interspersed within the voice or user data stream (carried in e.g., RTP packets) of an emergency call. Apparatus and methods are described for transmitting the data portion reliably from the initiating terminal (e.g., an in-vehicle system) to a Public Safety Answering Point CPSAP), by using the same transport connection as the user data.

U.S. Patent Application 2010/0069018 generally discloses a system and method to be used with first and second devices capable of communicating using a subset of different modulation schemes. The subset includes the method for optimizing transmission of data from the first device to the second device by comprising the acts of the first device, when receiving a trigger signal from the second device. The transmitted trigger signal includes data transmitted using a sequence of at least two of the modulation schemes from the subset. The system and method analyzes the received trigger signal to identify one of the modulation schemes from the subset as a function of the received trigger signal as an initial modulation scheme. The initial modulation scheme to be used to transmit data to the second device and transmitting the data from the first device to the second device.

SUMMARY

In a first illustrative embodiment, a vehicle communication system enables one or more processors to receive indication that an emergency event has taken place from emergency detection sensors positioned throughout the vehicle. An emergency condition detection signal may be automatically sent by a detection sensor, or manually sent by a vehicle occupant pushing an emergency assistance button. The processor may receive vehicle parameter data indicating one or more vehicle parameters including, but not limited to, vehicle global position coordinates. The processor may transmit a communication to an emergency response center that an emergency has been indicated at the vehicle. The vehicle parameter data may be transmitted to the emergency response center using a data transmission signal. If the data transmission signal has failed transmission after several attempts, the processor may convert at least a portion of the vehicle parameter data to speech signals and communicate the speech signals to the emergency response center.

In a second illustrative embodiment, a vehicle emergency response communication method enables several attempts and techniques for data transmission to an emergency call center. The method receives an emergency condition sensor indicating that at least one emergency condition detection signal has been enabled. The method receives vehicle parameter data indicating one or more vehicle parameters, and transmits a wireless communication to an emergency response center. The communication to the emergency response center indicates that an emergency condition has been detected at the vehicle and begins to transmit at least a portion of the vehicle parameter data. The vehicle parameter data is transmitting to the emergency response center using a data transmission signal including, but not limited to, data over voice. If the data transmission signal has failed transmission after a predetermined threshold including several retry attempts, the method may convert at least a portion of the vehicle parameter data to speech signals and communicate the speech signals to the emergency response center.

In a third illustrative embodiment, a system enables a processor to receive an emergency condition input indicating that an emergency event has taken place at the vehicle. The processor may receive a dataset including, but not limited to, GPS coordinates, a number of passengers in a vehicle, time stamp, vehicle identification, service provider identifier, and an e-call qualifier notifying the emergency response center that the emergency event has been manually or automatically initiated. Once the emergency condition input is received, the processor may transmit a wireless communication to an emergency response center through a wirelessly connected nomadic device. The wireless communication to the emergency response center may include the emergency condition at the vehicle and the dataset. The processor may detect a data transmission failure of the wireless communication to the emergency response center. Once the data transmission failure is detected, the processor may convert at least a portion of the dataset to voice. After a portion of the dataset is converted to voice, the processor may transmit the voice to the emergency response center over a voice-channel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
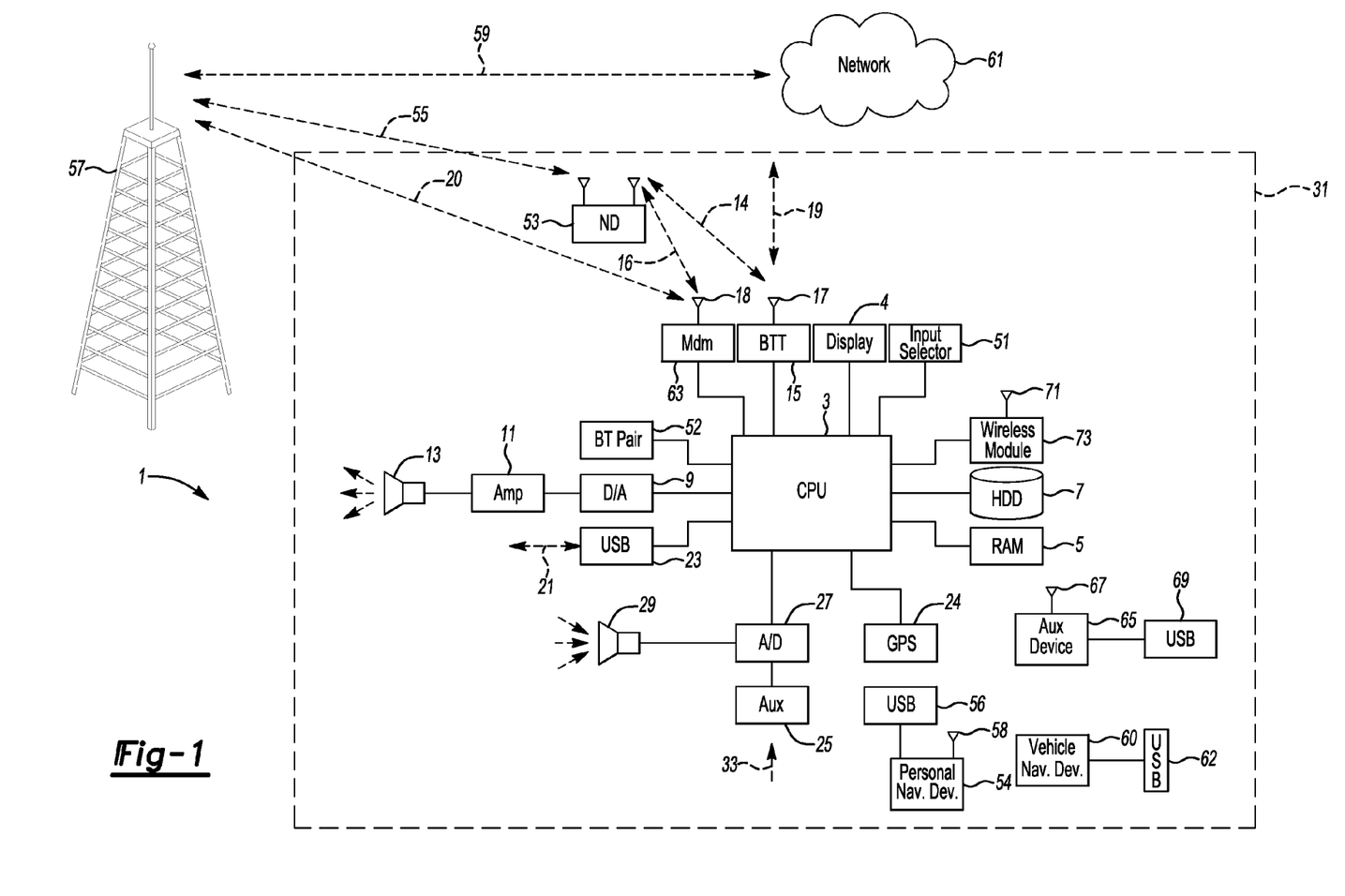
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
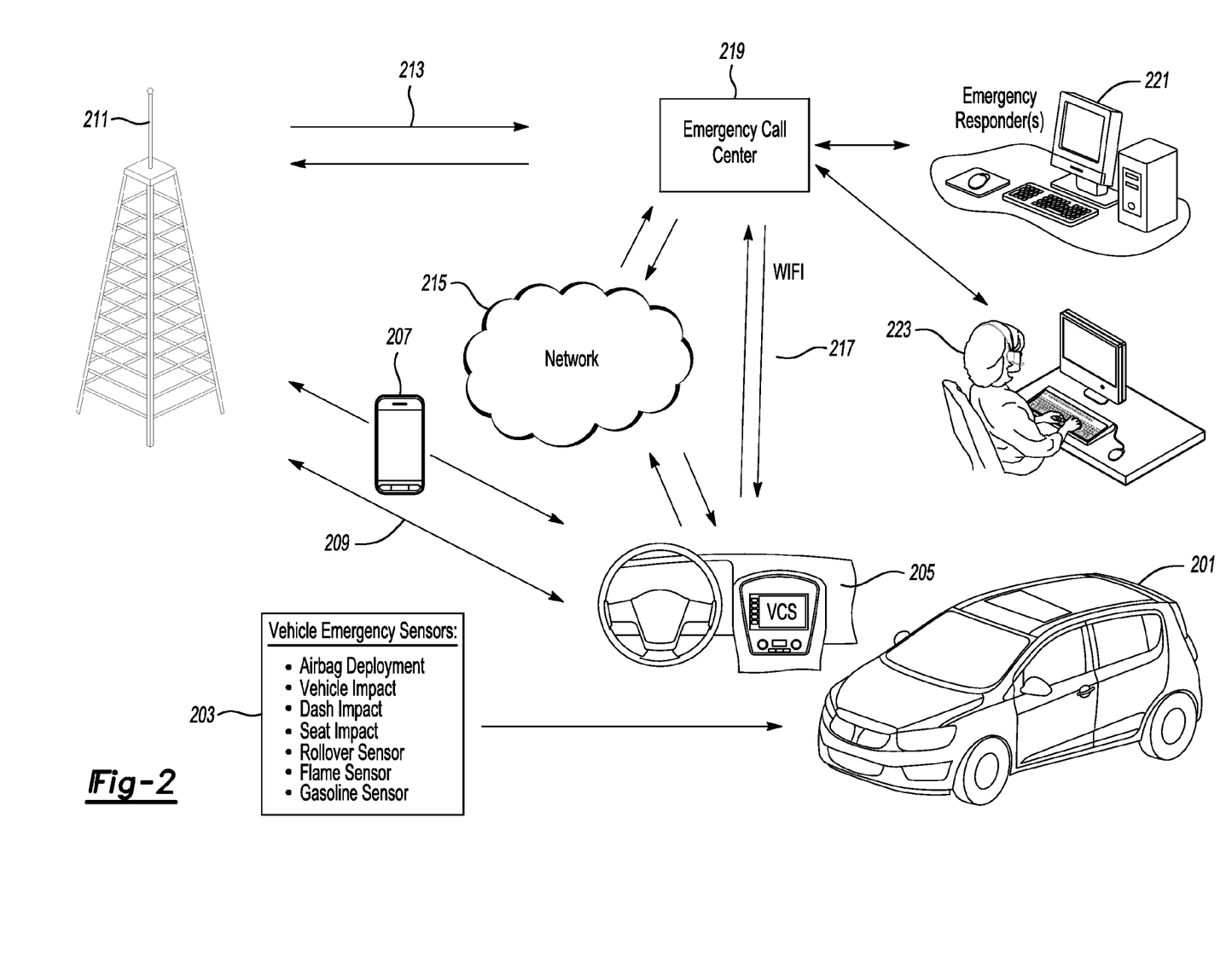
FIG. 2 is an exemplary block topology of a vehicle computing system for notifying an emergency responder of an automobile accident or other emergency.

FIG. 2 is an exemplary block topology of a vehicle computing system for notifying an emergency responder of an automobile accident or other emergency. Automobile accidents may be detected using one or more accelerometers and/or impact detecting devices mounted throughout the vehicle 201. The impact detecting devices 203 may include, but are not limited to, air bag deployment sensors, vehicle impact sensors, dash impact sensors, seat/occupant sensors, rollover sensors, flame/heat sensors, gasoline sensors and an occupant-activated panic button. The vehicle system architecture may comprise sub-systems, some of which may be interconnected by a vehicle network such as a Controller Area Network or other suitable communication network monitoring the one or more accelerometers and impact detecting sensors 203 within the vehicle 201.

The VCS may have one or more processors communicating with several subsystems receiving signals from detection sensor including a wide variety of different interconnections among subsystems and external communication networks. For example, a hard wire connection may be established between a cellular telephone and data processor, voice synthesizer, and/or DTMF interface. In another example, a processor may be connected directly or indirectly to emergency sensor module, and may monitor the ports to which the emergency sensor modules are attached instead of vehicle network.

In one embodiment of the present invention, a nomadic device 207 communicating with the VCS 205 using BLUETOOTH technology may establish wireless communication with a terrestrial tower 211. The terrestrial tower 211 in turn established communication through telephone switching network 213 with an emergency call center 219. Emergency call center 219 may include police, ambulance, a 911 or a 112 (Europe version of 911) public safety access point, or a call center.

In another embodiment of the present invention, an embedded cell phone within the VCS 205 may establish direct communication 209 with a terrestrial tower 211. Data may be uploaded and downloaded communicated from the VCS 205 to the emergency call center 219.

In one illustrative embodiment, the VCS 205 may communicate with a wireless device, or a remote computing system connected through the wireless device, for communication to the emergency call center 219. The wireless device may include, but is not limited to, an embedded cellular modem, embedded WiFi device 217, Bluetooth transmitter, Near Field Communication connected to phone, brought-in cellular device like a USB modem, MiFi, smartphone that may be connected to the vehicle through SYNC or other Bluetooth pairing device, or a PC network 215 that may be connected to the vehicle through SYNC or other Bluetooth pairing device. The VCS may wireless communicate a data transmission with the emergency call center 219 with the use of a wireless device. Once the vehicle system has enabled communication with the emergency call center 219, an operator 223 and/or emergency information can proceed to be downloaded and uploaded to an emergency response computer terminal 221.

The VCS may also communicate with a network having associated storage hosting a plurality of web pages for internet access by a plurality of browsers, including but not limited to emergency responder(s), cellular telephone owner(s), healthcare providers, etc. Some browsers, such as cellular telephone owners may upload data over Internet to storage, and other browsers, such as emergency responders may download data. The data may be uploaded and downloaded using several types of transmission mediums including, but not limited to narrowband, broadband, and/or voice over internet protocol.

The emergency call center 219 may receive a transmission of a set of data about the vehicle accident including, but not limited to, a geographic location of the vehicle. An embodiment method for transmitting this information may include, but is not limited to, in-band modem or data-over-voice. Once the information is received by the emergency call center 219, the information may be presented at a emergency responders computer terminal 221. Once the set of data has been transmitted to the emergency call center, the voice line may be opened allowing the passengers in the vehicle to communicate to the emergency call center operator 223.

Figure 3:
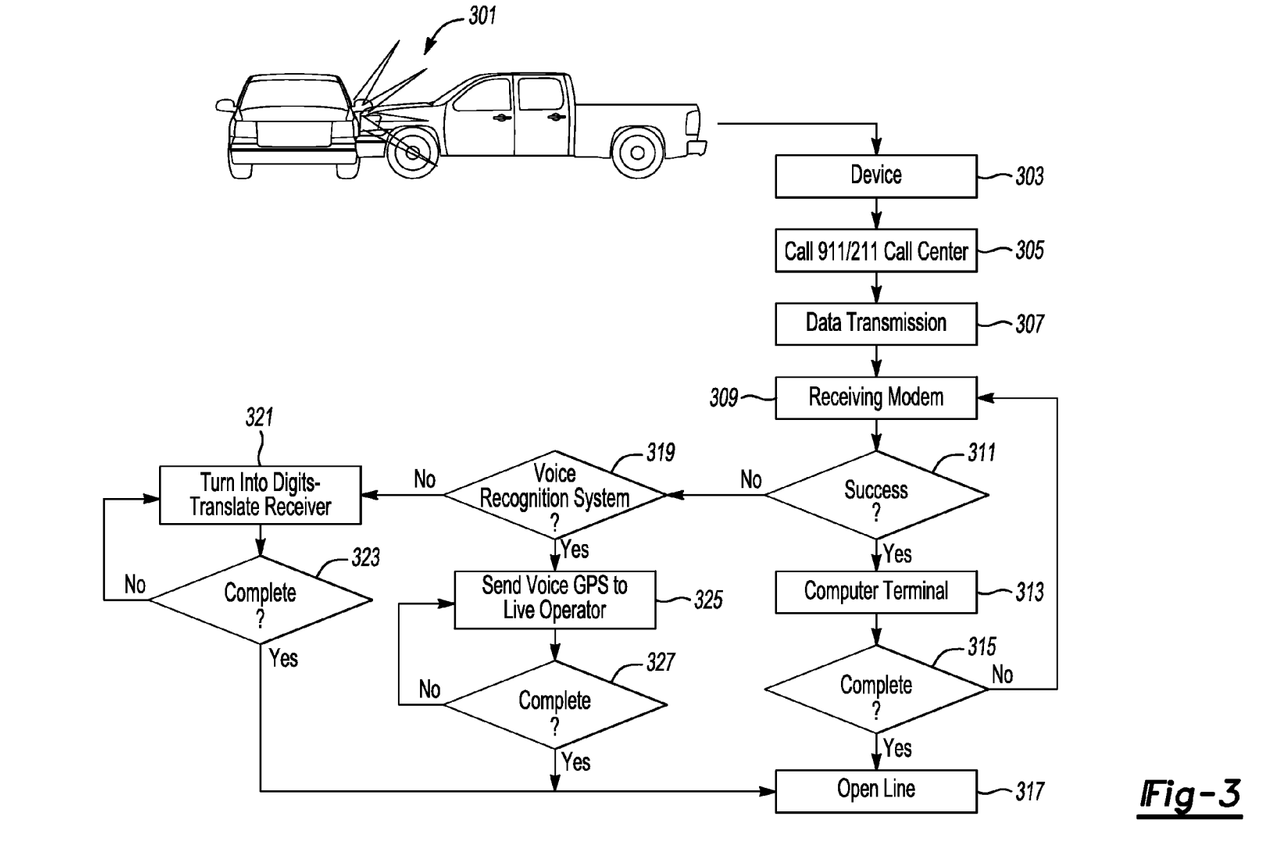
FIG. 3 is a flow diagram illustrating an example process for implementing embodiments of the present invention.

FIG. 3 is a flow diagram illustrating a process for implementing embodiments of the present invention. The process describes communicating electronic vehicle parameter data, such as the number of occupants in a vehicle, the time and location of the collision to authorities in the event a collision is detected. The process describes various methods to communicate a set of data from a vehicle to the emergency call center including, but not limited to, in-band modem, data over voice, computer-to-computer communication by transmitting the data converted to binary digits, and/or digitally generated voice data communicated to an operator. The process allows a data set to be communicated by computer generated spoken word if the data over voice transmission has failed.

In some instances during transmission of the data set using data over voice, critical location data may not be transmitted preventing the emergency call center to receive the location of the crash. Another example is if after several failed attempts to send the critical location data using data over voice, the system may open the voice line however this is ineffective if the vehicle occupants are unable to communicate to the operator. To solve this problem the system may generate spoken word of the data set, including the critical location data, after several attempts to send the data using data over voice has failed.

At step 301, the VCS or vehicle subsystem may monitor one or more accelerometers and/or impact detecting devices mounted within the vehicle or on a nomadic device. Based on the analysis of one or more of these sensors, the VCS of vehicle subsystem may detect an accident. Once an accident has been detected the VCS may communicate to a nomadic device that an accident has been detected and to begin initialization of data to be transmitted to an emergency call center. The VCS may begin to gather a set of data to transmit to the call center including, but not limited to, GPS coordinates, the number of passengers in the vehicle, time stamp, vehicle identification, service provider identifier, and an e-call qualifier notifying the call center that the call has been manually or automatically initiated.

At step 303, upon receipt of notification of an emergency notification signal, a device may initialize communication with the emergency call center. The device may have a local communication link established with the VCS. The link may be a BLUETOOTH piconet, or other suitable short-range network, wired or wireless system. The status of the link may include the connectivity of the paired cellular telephone, the signal strength, the identity of other available devices, etc. The link status may be reported by LCD display, LED, or audibly to the vehicle passengers. Preferably, a warning or other notification is provided to passengers within the vehicle compartment when a link is disrupted, or when no link is available. The device may include, but is not limited to, a cellular telephone, smart phone, tablet, laptop, or other device that may communicate between the VCS to an emergency call center.

At step 305, the system may notify occupants of the vehicle that an 911 or 211 emergency call to one or more emergency responders or other contacts is going to be made at the device. Occupant notification may be done audibly using voice synthesizer and speaker which may or may not be a component of the vehicle sound system. The system may automatically contact the emergency call center, for example, by dialing 911 (or 211 in Europe) if one or more emergency sensors detects an accident. The VCS may be manually initiated to contact an emergency call center by a vehicle occupant by pressing a button within the vehicle or saying "911".

At step 307, once connected with the emergency call center, the VCS may begin to communicate the set of data to the emergency call center. In one illustrative embodiment, the set of data may be transmitted to the emergency call center using data-over-voice communication. The receiving modem at the emergency call center may accept the data set from the device at step 309. The system may verify if the set of data has been transferred successfully at step 311. Not shown in the process is if the system fails transmission of the set of data, the VCS may try to reconnect a predefined number of times.

At step 313, once the data has been successfully transferred to the emergency call center modem, the data may be presented on a computer terminal. The system may verify if the data is complete at the emergency call center computer terminal at step 315. If the data is incomplete at the computer terminal, the system may request for the information again at the receiving modem. In one illustrative embodiment, the emergency call center may notify the device that the data set is incomplete. Once the data set has been completely transferred to the emergency call center computer terminal, the system may open the device voice line allowing for the vehicle occupants to communicate with the emergency call center operator at step 317.

At step 311, if the data set transmission has failed being transmitted, the system may employ a voice message of the data set. A voice recognition system may allow the data set to be translated into spoken word at step 319. The voice recognition system allows the VCS to interact with the emergency call center operator. An illustrative example may include the GPS coordinates to be transferred into spoken word, allowing the emergency call center operator to send help to the appropriate location at step 325. If the voice message is incomplete, the message may be played one or more times at step 327. The message reply may be based on the emergency call center operator instructions or request. Once the data set has been completely transferred by spoken word to the emergency call center, the system may open the device voice line allowing for the vehicle occupants to communicate with the emergency call center operator at step 317.

At step 321, if the system does not include a voice recognition system, or an error has occurred during translation into spoken word, the system may turn the data set into digits. An example may be turning the GPS coordinates into binary code allowing the emergency call center computer to receive the information and present the data set onto the emergency call center computer terminal. The system may validate if the data set has been completely received at step 323. Once the data set has been completely transferred by digits to the emergency call center, the system may open the device voice line allowing for the vehicle occupants to communicate with the emergency call center operator at step 317.

Figures 4, 5:
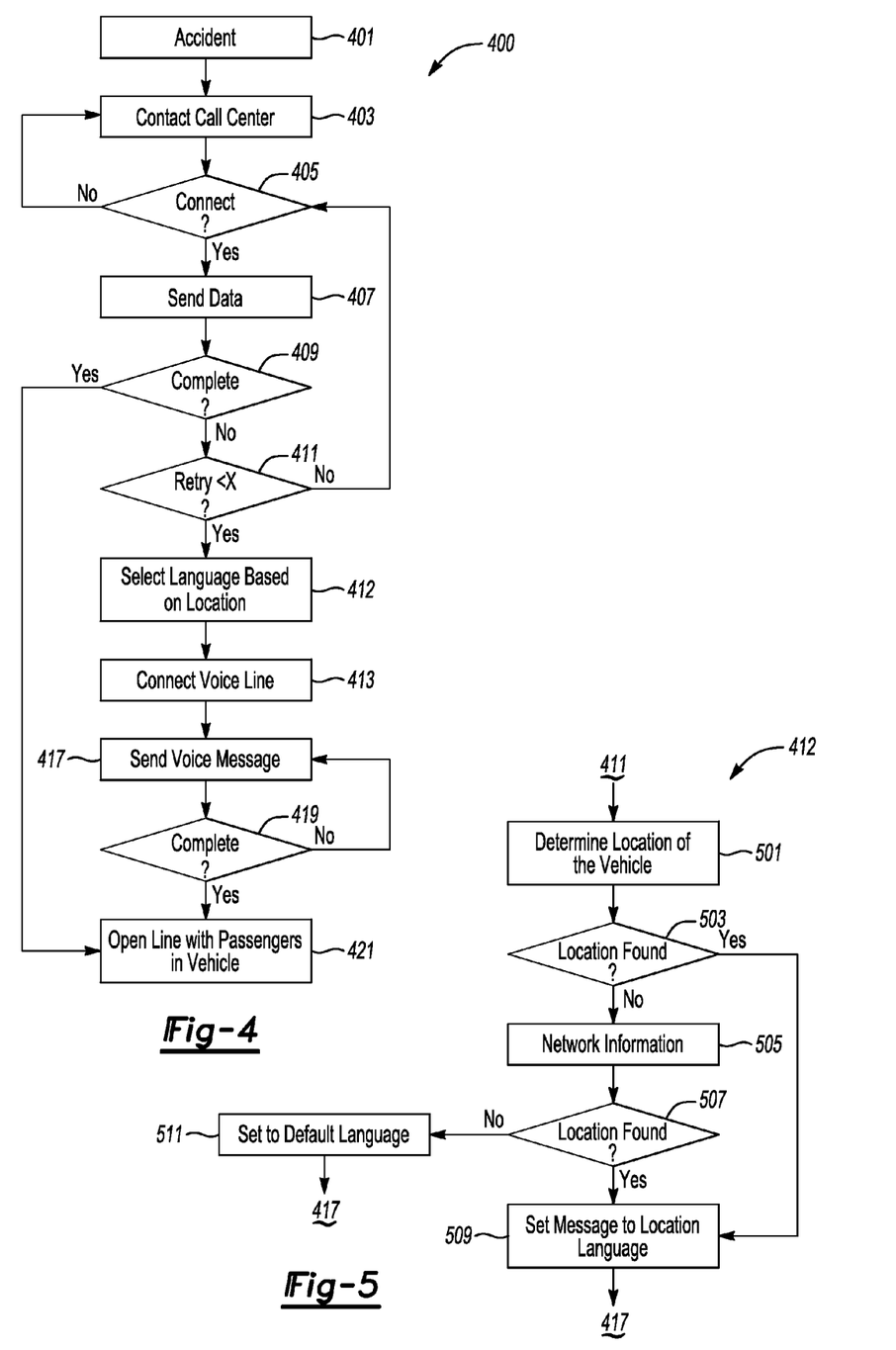
FIG. 4 is a flow chart illustrative of a vehicle computing system for notifying an emergency responder of an automobile accident or other emergency.
FIG. 5 is a flow chart illustrative of a vehicle computing system for determining a language to send a message to an emergency responder.

FIG. 4 is a flow chart illustrative of a vehicle computing system with one or more processors configured to notify an emergency responder of an automobile accident or other emergency. Once an accident is detected by the VCS, a set of data may be sent to an emergency call center. The set of data being transmitted to the emergency call center may include, but is not limited to Global Position System coordinates. The transmission of data may be accomplished using data over voice. The following illustrative flow chart describes a method for employing a voice message of data when transmission of the data set is not successful.

At step 401, the VCS may monitor one or more accelerometers and/or impact detecting devices mounted within the vehicle or on a nomadic device. Based on the analysis of one or more of these accident detection sensors, the VCS may detect an accident. After an accident has been detected, the VCS may begin initialization of data to be transmitted to an emergency call center and communicate to a nomadic device that an accident is detected.

At step 403, a nomadic device may receive a request from the VCS to contact an emergency call center. The nomadic device may include, but is not limited to, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC that may be connected to the vehicle through SYNC or other Bluetooth pairing device. The nomadic device may detect connection with the emergency call center at step 405. If the nomadic device fails connection with the emergency call center, it may retry to contact the call center at step 403.

At step 407, once the nomadic device is connected to the emergency call center, the VCS may begin to wirelessly transmit the data set to the emergency call center through the nomadic device. If the data set has been transmitted successfully, the voice line is opened to allow the vehicle occupants to communicate with the emergency call center operator or other emergency responder at step 421.

At step 411, the VCS may attempt several retries of transmitting data to the emergency call center based on a predefined calibrated threshold if the transmission of the set of data using data over voice has failed. An example of a predefined calibrated threshold may include three attempts made to transmit the set of data using data over voice. After several attempts have been made to transmit the data set using data over voice, the VCS may determine the location of the vehicle and begin to select a language to translate the data set into spoken word based on vehicle location at step 412. Once the location is determined, the VCS may convert the data set into word and/or phrases that may need to be translated. For example, the data set spoken into words based on location may be implemented in the European Union where several countries speaking their own language are closely located to each other. Another example, in China and India, there is several dialects of the official language spoken between the different regions of those respective countries.

At step 413, once the location has been determined and a language selected, the VCS may connect the voice line with the emergency call center. Once the voice line is connected, the VCS may transmit the voice message of the data set through the nomadic device to the emergency call center at step 417.

In another illustrative embodiment, the VCS may convert the data set into computer language or text message allowing communication of the data to take place between the VCS and the emergency call center computer system. The information may be converted at the emergency call center computer terminal for display to an operator or other emergency responder.

At step 419, the system may determine if the complete set of data in spoken word has been transmitted to the emergency call center. If the system detects that the set of data in spoken word is not complete, it may retry to send the voice message. Once the complete voice message has been transmitted, the system may open the voice line allowing the vehicle occupants to communicate to the emergency call center operator at step 421.

FIG. 5 is a flow chart illustrative of a vehicle computing system determining a language to send a message to an emergency responder. The VCS may automatically provision an emergency call language based on a determination that a new language is appropriate based on, for example, a vehicle location. Although a user could drive for a thousand miles in America and never cross a national border, such a trip in, for example, Europe, is almost certain to cross one or more national borders. While it may be common for citizens of Europe to each speak several languages, it is not desirable to rely on the ability of an emergency operator to speak the language of a user, when the user is outside of a home country.

For example, if the user originated in France, then the user may have set the vehicle computing system to respond to and speak in French. This could be the user's own language, a common international language, such as English, and may also be the language of the Emergency Operator for an emergency phone calls placed while in France.

If the user were to travel in the vehicle, however, a drive of several hours could easily find the user in Germany. While it may be possible that a particular German Emergency Operator could speak French, it is certainly not preferable to rely on such an occurrence in the event of a vehicle emergency, such as an accident. Further, if the operator doesn't speak French, not only will the vehicle communication system be unable to successfully communicate the translated sound bit of vehicle parameter data with the operator in French, but if the driver only speaks French, then even an open line between the driver and the operator will be to no avail.

In this illustrative embodiment, the vehicle communication system can automatically switch to a local language, so that emergency communication is possible between the operator and the vehicle, even if no one in the vehicle speaks the appropriate language.

When a cellular phone, or other nomadic device, connects to a cellular tower, in, for example, Europe, configuration information may be passed between the tower and the device. This information can be used to establish a connection between the tower and the device, and, in particular, it may also contain a code (such as a mobile country code (MCC)) establishing the country of origin of the tower (or some other designation based on a code).

In this illustrative embodiment, continuing from a vehicle computing system notifying an emergency responder of an automobile accident from step 411, a vehicle computing system polls a paired nomadic device periodically to obtain at least a designation code at step 501. The system may open a connection to the nomadic device. The system then checks to see if cellular communication information is stored within the device. For example, if the device stores a configuration packet received from a cellular tower or other communication point, then the system may be able to retrieve that packet from the device.

At step 503, if the location is found, the system may proceed to translate the data set to the appropriate language for a voice message transmission to an emergency call center. The set of data voice message may be translated to the location language of the vehicle at step 509.

At step 505, if there is no such data stored locally in the device, then the system may instruct the nomadic device to initiate communication with a cellular tower or other communication point, in order to receive a configuration packet.

The configuration packet is then transferred from the nomadic device to the VCS. Based on an origin code or other designation, the VCS can determine the local language of choice. In this illustrative example, a lookup table is used for this determination of words and phrases, although other suitable methods may also be used.

At step 507, once a local language is determined, the vehicle computing system can set up access to, for example, a preset database of words in that language. The VCS may implement a number of look-up tables in the software to determine word translations for the dataset variables in the selected language of the vehicle location. In the event an emergency call is placed, the system can draw on this database to communicate with an emergency operator and/or translate the data set to the appropriate voice message language at step 509.

At step 511, if a local language is not determined, the vehicle computing system can establish the set of data voice message to a default language. The default language may be preset by the vehicle operator during VCS setup. Once the default language is set, the set of data may be translated to the default language and ready for transmission to the emergency call center at step 509.

In this illustrative embodiment, fully switching between language packs when the local language changes is not the preferred option. It can take up to a minute to switch the language of the vehicle computing system to another installed language pack. Further, it may be that the language option for the local language is not presently installed in the user's VCS. Installing the language could require a charge, a lengthy download, or even possibly physical insertion of a persistent memory device containing a new language.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle communication system, comprising:
   one or more processors configured to:
      receive at least one emergency condition detection signal;
      receive vehicle parameter data indicating one or more vehicle parameters;
      use data transmission signaling to transmit a wireless communication to an emergency response center, the communication indicating the vehicle parameter data; and
      if the data transmission signaling has failed after a predetermined threshold, convert at least a portion of the vehicle parameter data to speech signals and communicate the speech signals to the emergency response center over a voice channel.

2. The vehicle communication system of claim 1 wherein the one or more processors are additionally configured to receive a geographic location of the vehicle, and output the speech signals in a language spoken at that location.

3. The vehicle communication system of claim 2 wherein the language is selected based on a look-up table.

4. The vehicle communication system of claim 1 wherein the one or more processors are additionally configured to:
   establish communication between the vehicle computing system and a nomadic device; and
   establish communication between the emergency response center and the vehicle computing system through the nomadic device after the emergency condition is detected.

5. The vehicle communication system of claim 1 wherein the data transmission signaling includes data over voice.

6. The vehicle communication system of claim 1 wherein the wireless communication includes a cellular phone.

7. The vehicle communication system of claim 1 wherein the vehicle parameter data includes global position system coordinates of the vehicle.

8. A computer-implemented method comprising:
   receiving an emergency condition detection signal;
   receiving vehicle parameter data indicating a vehicle parameter;
   using data transmission signaling, transmitting a wireless communication, including the vehicle parameter data, to an emergency response center; and
   if the data transmission signaling has failed after a predetermined threshold, converting at least a portion of the vehicle parameter data to speech signals and communicating the speech signals to the emergency response center over a voice channel.

9. The method of claim 8, further comprising:
   establishing communication between a vehicle computing system and a nomadic device; and
   establishing communication between emergency response center and the vehicle computing system through the nomadic device.

10. The method of claim 9 wherein the nomadic device includes a cellular telephone.

11. The method of claim 9 wherein the communication between the vehicle computing system and the nomadic device includes Bluetooth technology.

12. The method of claim 8 wherein the predetermined threshold includes three attempts of transmitting of the vehicle parameter data using the data transmission signaling.

13. The method of claim 8 wherein the data transmission signaling includes data over voice.

14. The method of claim 8 further comprising the converting of at least a portion of the vehicle parameter data to speech signals by:
   determining a word or phrase to be communicated to an emergency operator from the vehicle computing system;
   looking up the determined word or phrase in a lookup table to determine a corresponding sound bite to be played; and
   playing the determined corresponding sound bite over an outgoing communication with the emergency operator, such that the sound bite communicates the determined phrase in a language to the emergency operator.

15. A system comprising:
   a processor configured to:
      receive a vehicle parameter dataset based on an emergency condition input;
      transmit a wireless communication to an emergency response center through a wirelessly connected nomadic device, including the emergency condition and the dataset;
      if the dataset transmission has failed after a predetermined threshold, convert at least a portion of the vehicle parameter dataset to voice; and
      transmit the voice to the emergency response center over a voice-channel.

16. The system of claim 15 wherein the dataset includes one or more of: GPS coordinates, number of passengers in a vehicle, time stamp, vehicle identification, service provider identifier, and an indication notifying the emergency response center that the emergency condition input has been manually or automatically initiated.

17. The system of claim 15 wherein the processor is additionally configured to convert data received from the dataset to a text message.

18. The system of claim 15 wherein the nomadic device includes a cellular telephone.

19. The system of claim 15 wherein the wireless communication with the nomadic device includes Bluetooth technology.

20. The system of claim 15 wherein the processor is additionally configured to open a line of communication allowing an emergency call center operator to communicate with occupants of a vehicle.

* * * * *